June 23, 1953    L. M. POTTS    2,643,291
TELEGRAPH CONVERTER SYSTEM AND APPARATUS
Original Filed June 18, 1947    10 Sheets-Sheet 1

INVENTOR
LOUIS M. POTTS, DECEASED
MARTHA W. C. POTTS, EXECUTRIX
BY Emery Robinson
ATTORNEY

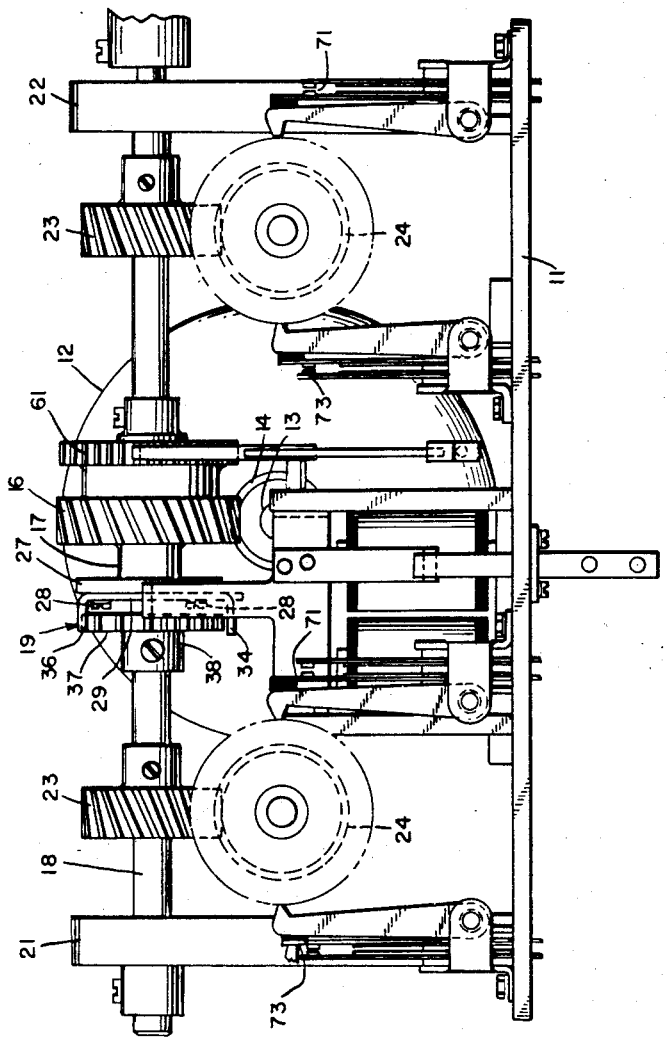

June 23, 1953 L. M. POTTS 2,643,291
TELEGRAPH CONVERTER SYSTEM AND APPARATUS
Original Filed June 18, 1947 10 Sheets-Sheet 3

INVENTOR
LOUIS M. POTTS, DECEASED
MARTHA W. C. POTTS, EXECUTRIX
BY Emery Robinson
ATTORNEY June 23, 1953  L. M. POTTS  2,643,291
TELEGRAPH CONVERTER SYSTEM AND APPARATUS
Original Filed June 18, 1947  10 Sheets-Sheet 4

INVENTOR
LOUIS M. POTTS, DECEASED
MARTHA W. C. POTTS, EXECUTRIX
BY
Emery Robinson
ATTORNEY June 23, 1953  L. M. POTTS  2,643,291
TELEGRAPH CONVERTER SYSTEM AND APPARATUS
Original Filed June 18, 1947  10 Sheets-Sheet 5
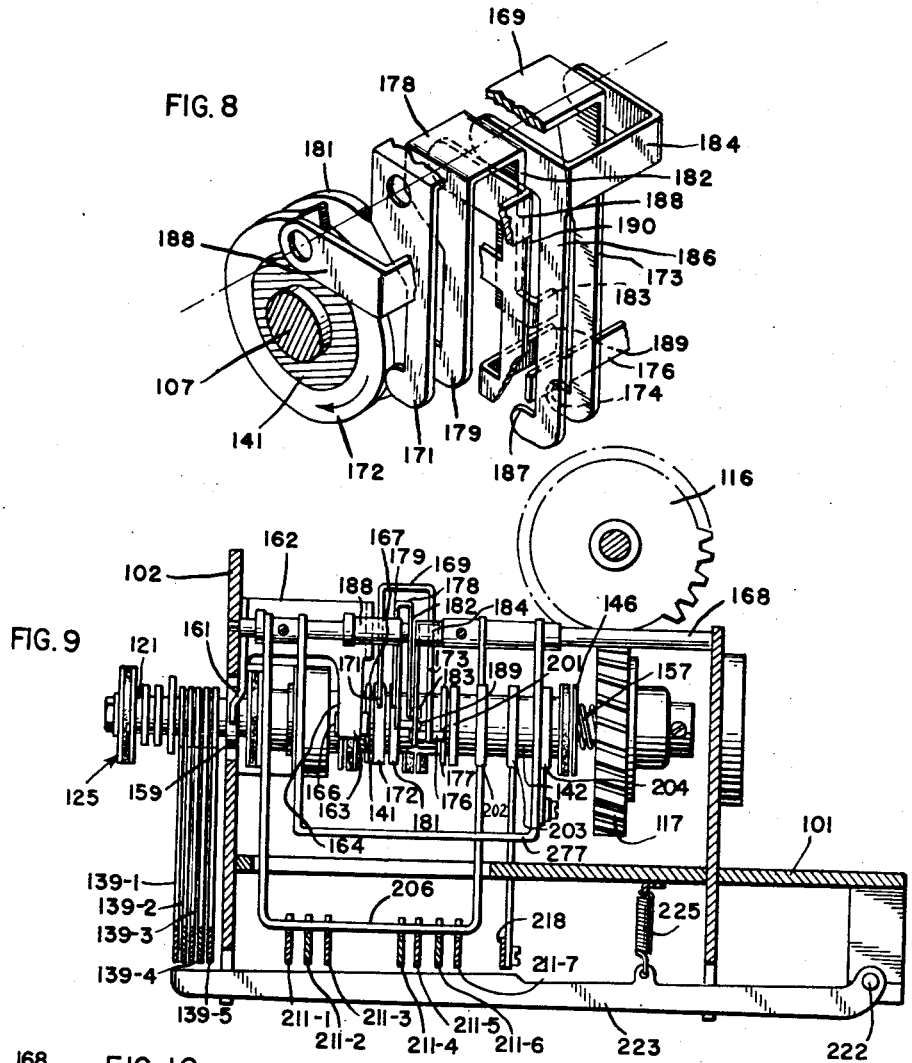
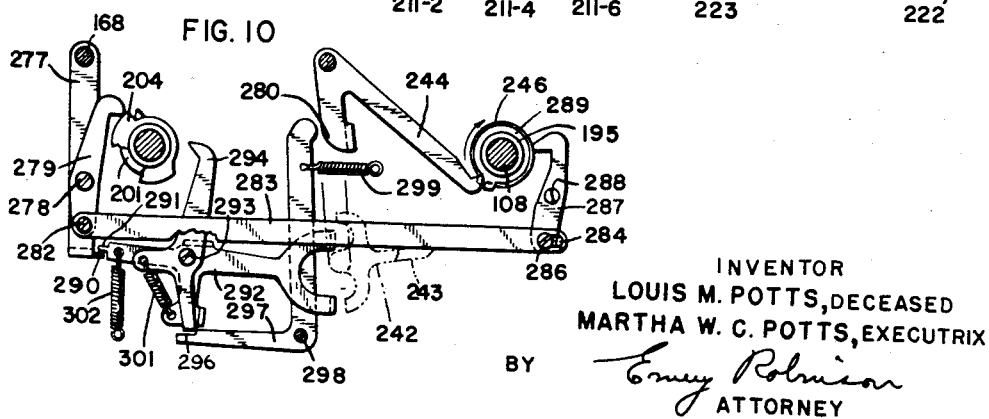
INVENTOR
LOUIS M. POTTS, DECEASED
MARTHA W. C. POTTS, EXECUTRIX
BY
ATTORNEY June 23, 1953 — L. M. POTTS — 2,643,291
TELEGRAPH CONVERTER SYSTEM AND APPARATUS
Original Filed June 18, 1947 — 10 Sheets-Sheet 6
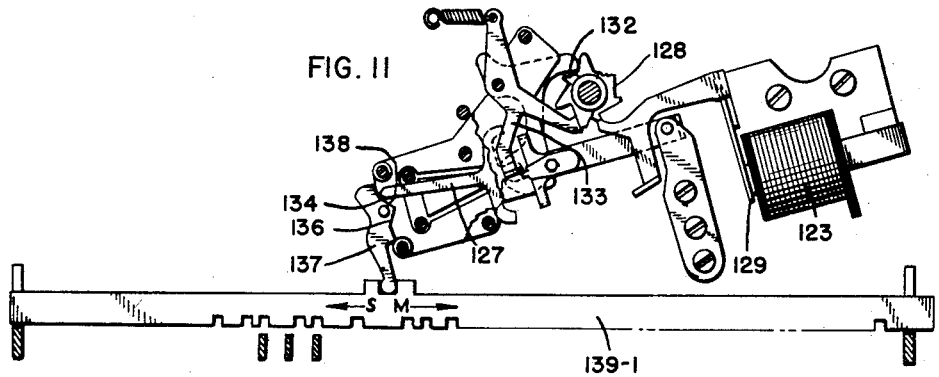
FIG. 11
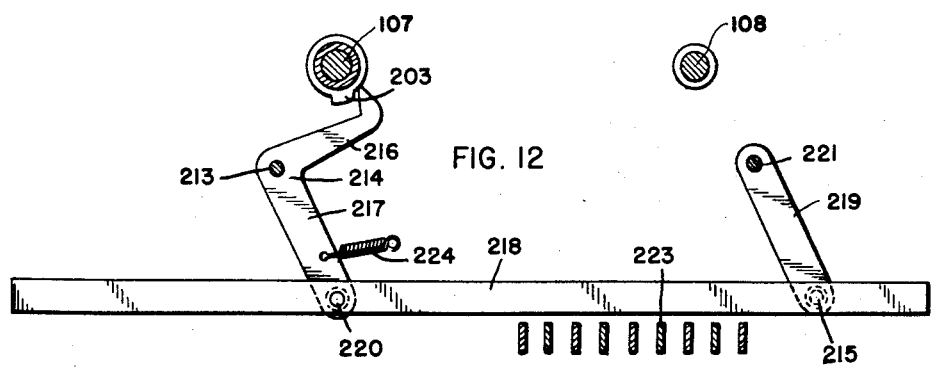
FIG. 12
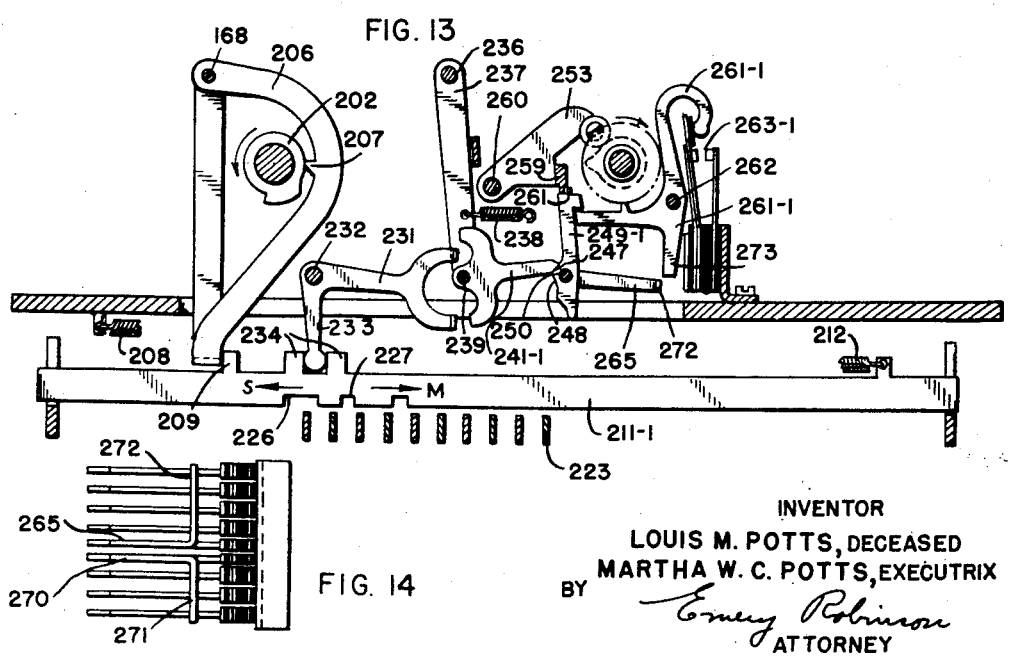
FIG. 13
FIG. 14
INVENTOR
LOUIS M. POTTS, DECEASED
MARTHA W. C. POTTS, EXECUTRIX
BY Emery Robinson
ATTORNEY

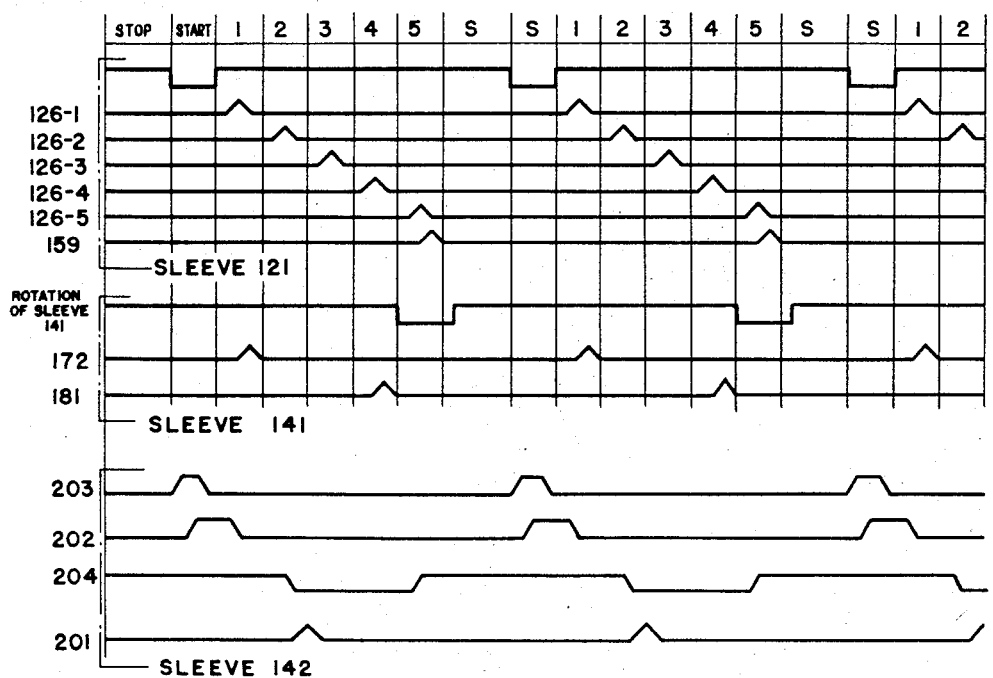
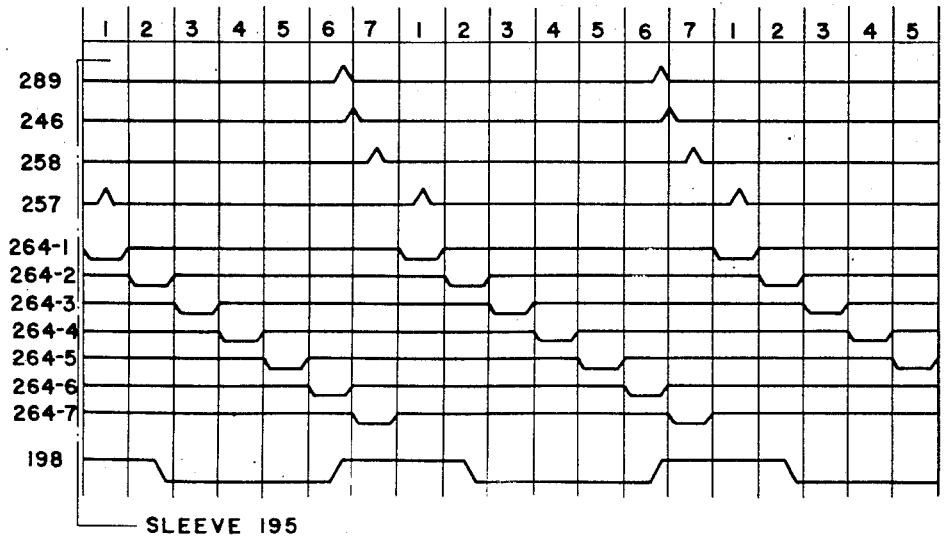
FIG. 15

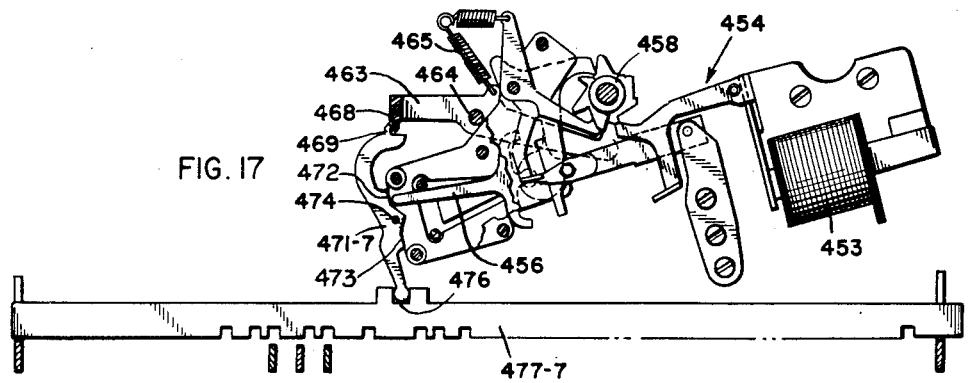
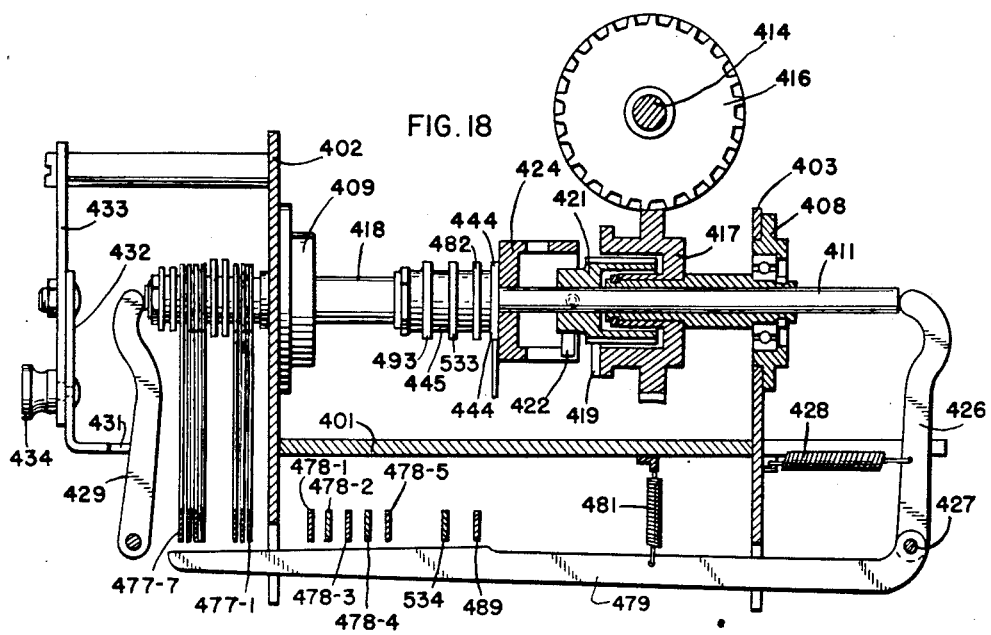
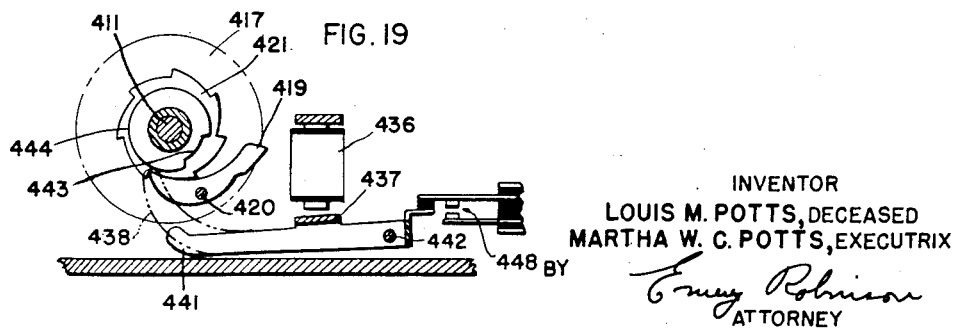
INVENTOR
LOUIS M. POTTS, DECEASED
MARTHA W. C. POTTS, EXECUTRIX
BY
ATTORNEY

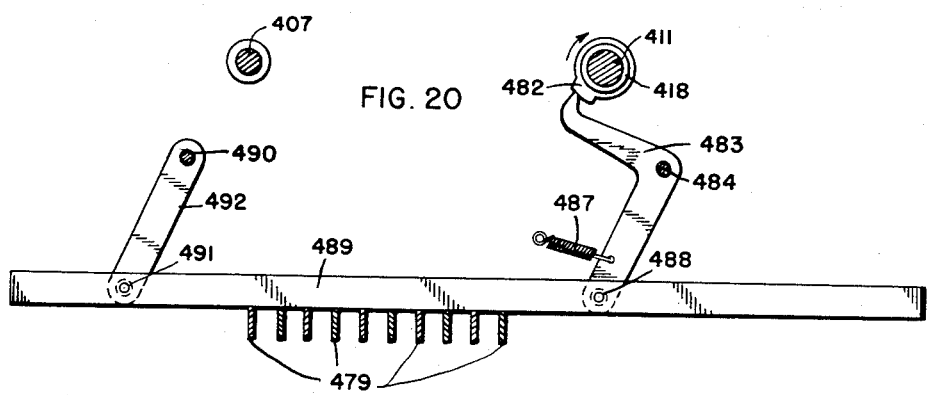
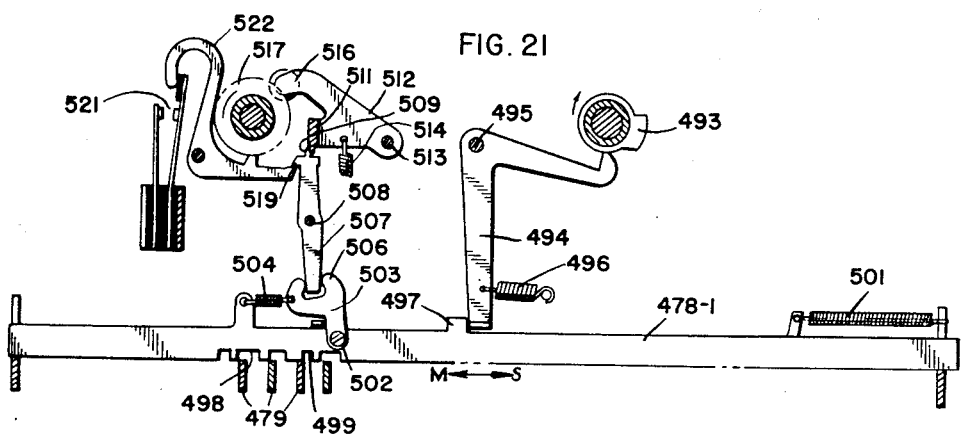
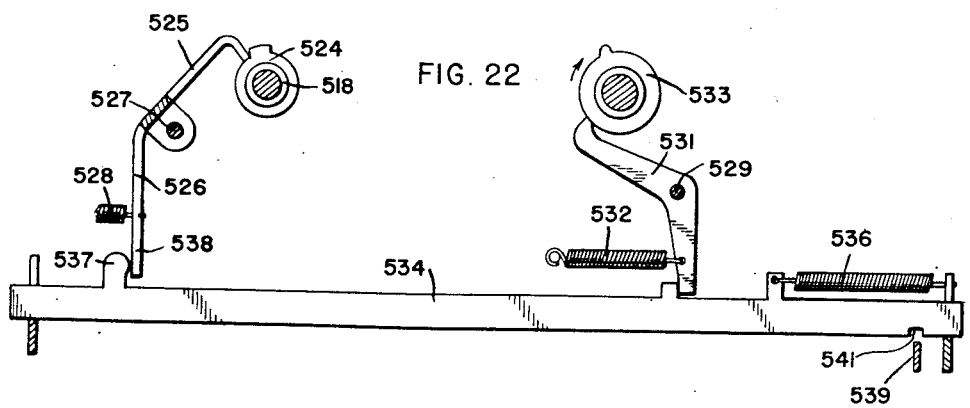

Patented June 23, 1953

2,643,291

UNITED STATES PATENT OFFICE 2,643,291

TELEGRAPH CONVERTER SYSTEM AND APPARATUS

Louis M. Potts, deceased, late of Evanston, Ill., by Martha W. C. Potts, executrix, Evanston, Ill., assignor to Teletype Corporation, Chicago, Ill., a corporation of Delaware Original application June 18, 1947, Serial No. 755,445, now Patent No. 2,579,612, dated December 25, 1951. Divided and this application May 10, 1950, Serial No. 161,102

8 Claims. (Cl. 178—26)

This invention relates to telegraph converter systems and apparatus wherein signal code combinations of one code are converted into signal code combinations of another code and subsequently reconverted into the original signal code combinations.

This application is a division of copending application Serial No. 755,445, filed June 18, 1947, now Patent No. 2,579,612, Dec. 25, 1951.

An object of the invention is to provide a mechanical converter unit for converting five unit start-stop signals into seven unit radio signals.

Another object of the invention is to provide a mechanical converter unit for reconverting seven unit radio signals into five unit start-stop signals.

An additional object of the invention is to provide a motor unit for driving both converter units mentioned above.

Further objects and advantages of the invention will appear as the invention is described in detail and restrictions of the scope of the invention should not be implied from the specific recital of the above appearing objects.

According to the parent invention, five unit start-stop signals provided by any conventional five unit start-stop transmitter are converted into seven unit radio signals and by means of a radio transmitter are sent to a distant station. At the distant station the seven unit radio signals are received by a radio receiver and reconverted into the original five unit start-stop signals to accordingly operate conventional telegraph recording apparatus. Use of the seven unit radio code with its error detecting feature has proved valuable where transmission of coded messages is required. For example, when coded messages are transmitted in a form such as "ABZ," such a group of letters may stand for a phrase, or even a complete sentence containing several words and receipt of a single incorrect character may render a message unintelligible or give to the message a meaning different than was intended. Each code combination in the seven unit radio code change contains three marking and four spacing impulses. Any deviation in this fixed ratio of the number of marking impulses to the number of spacing impulses causes the printing of an error indication character. A misselection indicator used for such a purpose is shown in the United States patent of L. M. Potts, No. 2,304,120 dated December 8, 1942. As will become apparent later in the description, in the present invention receipt of an all spacing signal by the five unit start-stop recorder causes the recording of an error indication character.

The present invention contemplates the use of three basic mechanical apparatus units, a motor unit, a five to seven unit code conversion unit, and a seven to five unit code conversion unit. The motor unit is used for driving both converter units or a series of such units. The motor unit in addition to driving the converter unit also drives two sets of cams which may control various cam operated contacts according to the particular system in which the motor unit is used. Also included in the motor unit are several phasing and orienting devices which will be taken up later in the description.

The five to seven unit code conversion unit includes a single magnet selector which sets up the positions of a series of five unit code bars. The setting of the five unit code bars selects one of a plurality of character bars which establishes a selection for a series of seven unit code bars. The selection of the seven unit code bars is in turn transferred to a series of seven gooseneck transmitting levers. Idle signals are automatically inserted to compensate for the gain of a seven unit transmitting cam sleeve, which continuously rotates, over a five unit start-stop selector sleeve. It should be mentioned at this time that in the seven unit radio system the idle signal contains marking impulses for the second, fifth and seventh elements of the code combination.

The seven to five unit conversion unit also includes a single magnet selector which sets up the positions of a series of seven unit code bars. The setting of the seven unit code bars selects one of a plurality of character bars, which establishes a selection for a series of five unit code bars. The setting of the five unit code bars is in turn transferred to a series of five gooseneck transmitting levers. When seven unit idle signals are received, the start-stop apparatus is not released so that no character will be printed by the five unit start-stop recorder at this time. If no regular message character or no idle signal character is received, it is an indication that the ratio of three marking impulses to four spacing impulses in the code combination has not been maintained. At this time, the gooseneck transmitting levers will function to send an all spacing signal to the five unit start-stop recording apparatus and in response to the receipt of such a code combination an error indication will be recorded.

A more comprehensive understanding of the invention may be had by reference to the following detailed description when read in conjunction with the drawings wherein:

Fig. 2 is a partial end view of the motor unit;

Fig. 8 is an enlarged detailed perspective view, partly exploded, of a mechanism used for delaying certain functional operations while idle signals are being transmitted;

Fig. 9 is a partial end view of the five to seven unit code conversion unit;

Fig. 10 is a detailed view of a part of the idle signal transmitting mechanism;

Fig. 11 is a detailed view, particularly illustrating the single magnet selector utilized in the five to seven unit conversion unit;

Fig. 12 is a detailed view of the character bar bail;

Fig. 13 is a detailed view of the five to seven unit conversion unit, particularly illustrating the mechanism used for storing and transferring seven unit code signals;

Fig. 14 is a detailed view of the latching levers used for the seven unit transmitting levers and the idle signal transmitting levers;

Fig. 15 is a timing diagram of the operation of the five to seven unit code converter unit;

Fig. 17 is a detailed view of the single magnet selector used with the seven to five unit code converter unit;

Fig. 18 is a partial detailed end view of the seven to five unit converter unit;

Fig. 19 is a detailed view of a finder mechanism used with the seven to five unit code converter unit;

Fig. 20 is a detailed view of the character bar operating bail of the same unit;

Fig. 21 is a partial detailed view of the mechanism utilized in the same unit for transmitting reconverted five unit start-stop signals;

Fig. 22 is a detailed view of a clutch operating mechanism used in the seven to five unit code converter unit.

Figure 1:
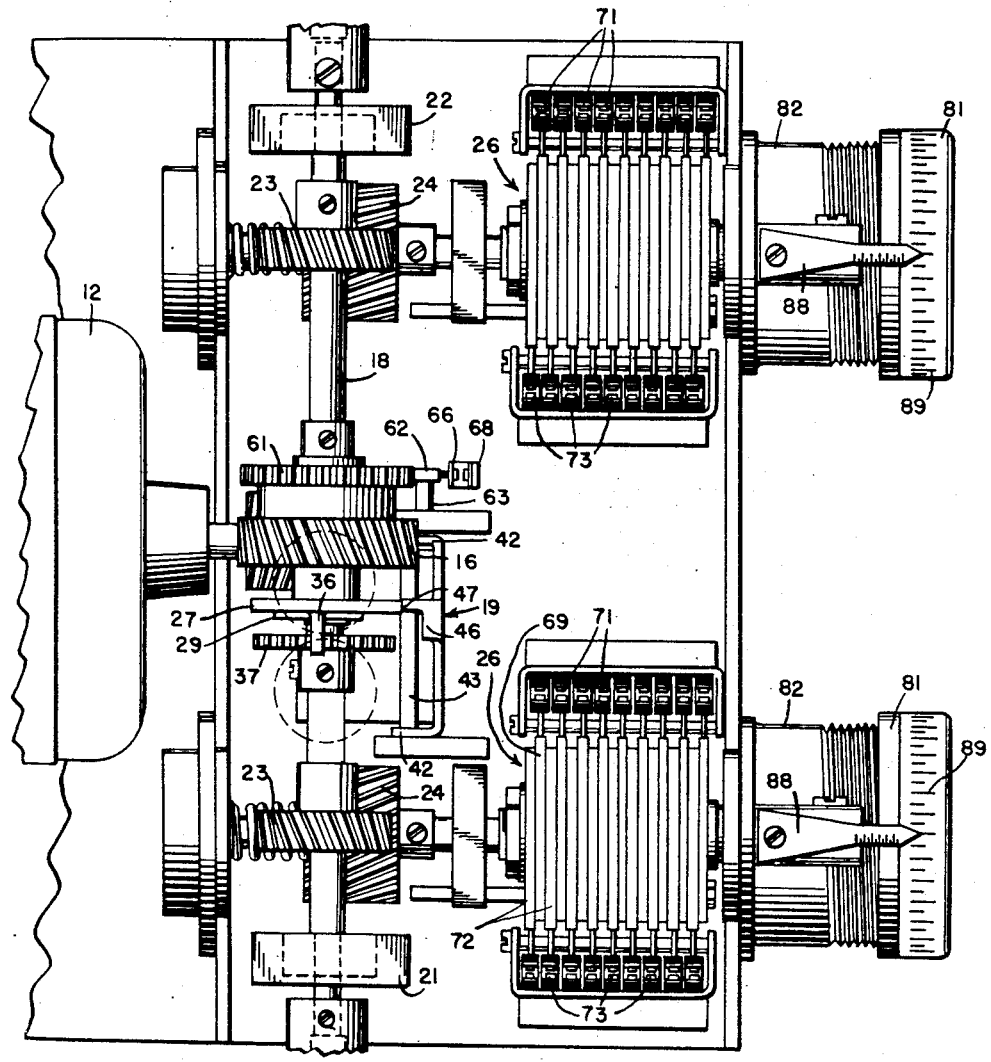
Fig. 1 is a plan view of the motor unit.

With particular reference to Figs. 1 to 5, inclusive, the motor unit contemplated by the present invention will first be described. Numeral 11 represents the base of the unit, upon which is mounted a motor 12 which imparts rotary movement to shaft 13 and a gear 14 fixedly carried thereby. Gear 14 is in mesh with a gear 16 supported upon a hub 17 which is mounted about a shaft 18 for relative movement with respect thereto. By means of an escapement mechanism 19 (to be later described), gear 16 drives the shaft 18 which is suitably journaled on the vertically extending supports 21 and 22. Fast to shaft 18 are the gears 23 which are in mesh with gears 24, for the purpose of driving identical cam assemblies 26 as will later be described.

Carried on the hub 17 which supports gear 16 is a cam 27 which by means of pin and slot connections 28 supports a slidable escapement member 29. A spring 31, attached at 32 to cam 27 and at 33 to escapement member 29, normally urges the escapement member in a downward direction as viewed in Fig. 4. Escapement member 29 is provided with a beveled camming projection 34 and with a driving projection 36 which engages the teeth of a ratchet 37 fixed to shaft 18 by means of a collar 38. Below shaft 18 is positioned a finder magnet 39 which controls armature 41 pivoted by means of lugs 42 on a fixed shaft 43. Armature 41 includes an upwardly extending arm 44 having beveled surfaces 46 and 47. A spring 48 normally urges armature 41 in a clockwise direction as viewed in Fig. 4.

Figure 4:
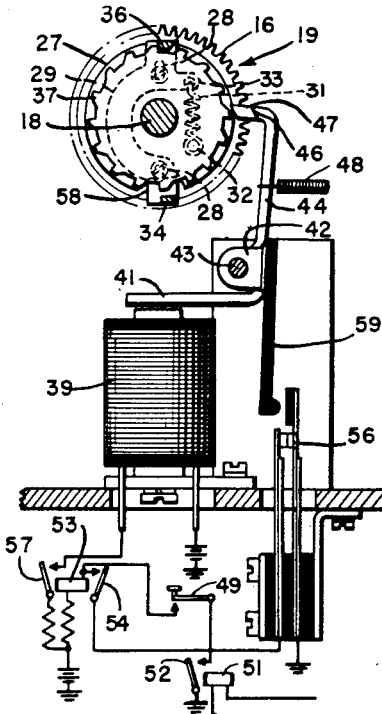
Fig. 4 is a detailed view of a portion of the motor unit showing a finder mechanism.
Figure 5:
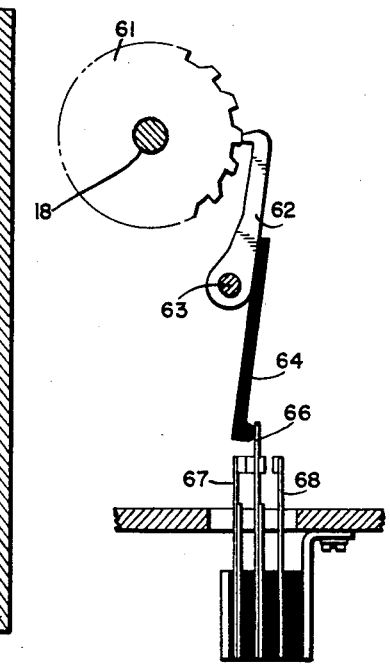
Fig. 5 is a detailed view of a cam operated contact device used in the motor unit for synchronizing purposes.
Figure 3:
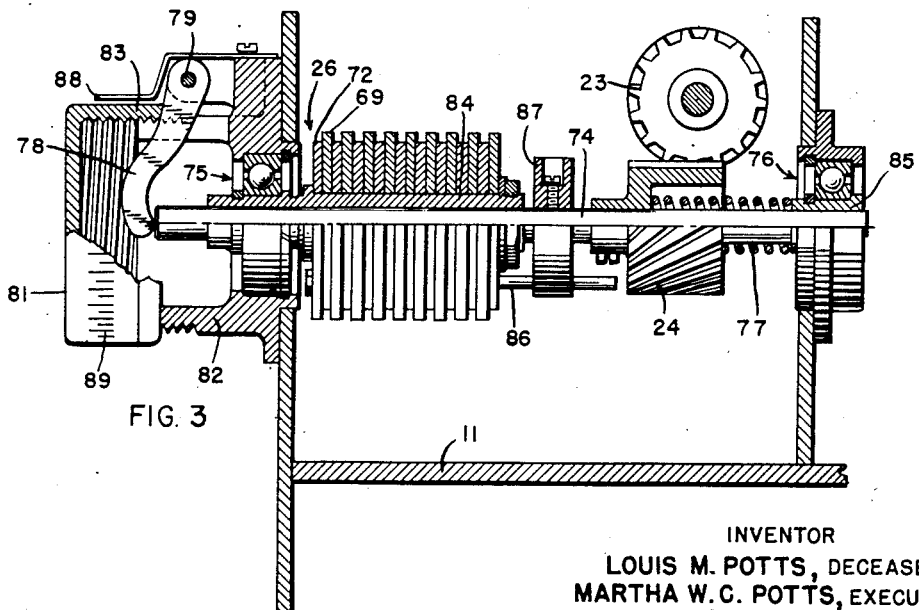
Fig. 3 is a detailed view of a portion of the motor unit particularly illustrating a cam sleeve orienting device.
Figures 6, 7:
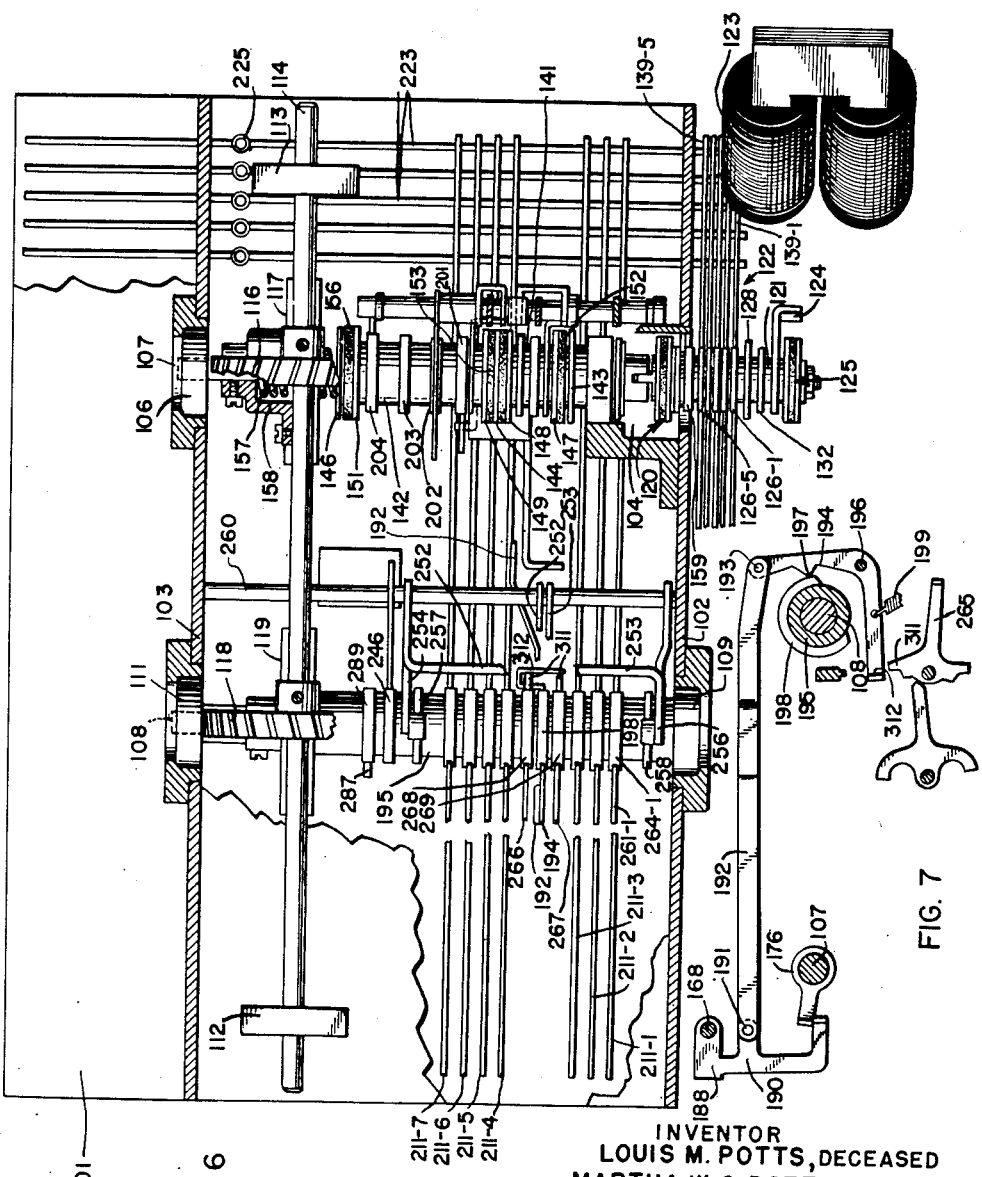
Fig. 6 is a plan view of the five to seven unit code conversion unit.
Fig. 7 is a detailed view of a portion of a mechanism used for transmitting idle signals in the five to seven unit code conversion unit.

In accomplishing a finding operation a key 49 is depressed while incoming idle signals are being received. If marking impulses are not received for the second, fifth and seventh impulses as will later be described in connection with the system operations, a relay 51 will be energized and a circuit will be completed through attracted contact tongue 52 for relay 53 which will lock up through its contact tongue 54 and contact pair 56. As contact tongue 57 is attracted, finder magnet 39 is energized and armature 41 moves counterclockwise. Cam 27 is provided with a groove 58, and as this groove presents itself to beveled projection 47 of arm 44 of armature 41, the armature is free to pivot counterclockwise, and as it does so, beveled projection 46 carried by arm 44 engages beveled projection 34 of escapement member 29, camming the escapement member to the left as viewed in Fig. 4. As the escapement member snaps back to its original position on its continued rotation, driving projection 36 of the escapement mechanism will engage the next succeeding tooth of ratchet 37 so that a change in the driving relationship between gear 16 and shaft 18 has now taken place. In other words, ratchet 37 has slipped back one tooth with respect to escapement member 29. As the armature 41 pivots counterclockwise as just explained above, its insulated tail 59 opens the contact pair 56 to break the locking circuit for relay 53. As long as the apparatus is out of phase with incoming idle signals, relay 51 will become energized and the ratchet 37 will slip back a tooth with respect to escapement member 29 in each rotation of gear 16. This presumes that the key 49 will be held down until a point will be reached whereat relay 51 will no longer energize and a circuit cannot be completed through contact tongue 52 for the operation of relay 53. This indicates that the idle signals are being properly received and that the apparatus has been brought into phase with remotely located apparatus. The operation of the escapement mechanism 19 will be better understood when the system descriptions are later considered. The circuit shown in Fig. 4 is provided only for the purpose of illustrating the mechanical aspects of the operation of the escapement mechanism.

Fixedly secured to shaft 18 is a cam 61 whose periphery is pursued by a follower 62 which is pivoted at 63. The number of lobes on the cam 61 may vary with the system in which the apparatus is used so that insulated tail 64 carried by the follower 62 may operate contact blade 66 back and forth between contact blades 67 and 68 a fixed number of times in each revolution of shaft 18. The contact blades 66, 67, and 68 are associated with a tuning fork phasing arrangement, the details of which will be described hereinafter in connection with the systems.

Returning now to the cam assemblies 26, a description of an orienting mechanism associated with each of said assemblies will be described. Cams 69 control contact pairs 71 at one side of each cam assembly while cams 72 control contact pairs 73 located at the opposite side of each cam assembly. Contact pairs 71, 73 are described here for the purpose of illustration but it will be understood that different numerals will be assigned to the contact pairs shown in the system descriptions as will later appear. Gear 24 is fixed to a slidable shaft 74 mounted within a cam sleeve 84 and a sleeve 85 which are journaled on ball bearings 75 and 76. A coiled spring 77 urges the shaft 74 to the left as viewed in Fig. 3 by pressing against the interior of gear 24. Leftward movement of shaft 74 is adjustably restricted by means of a lever 78 pivoted at 79. For adjusting the position of shaft 74 a cup shaped dial member 81 is provided which is threaded upon the annular member 82 and the rim 83 of which bears against lever 78. Thus, by turning the dial member 81 the position of shaft 74 will be adjusted and the relationship between the spiral driving gear 23 and the spiral driven gear 24 may be varied. Projecting through the cluster of cams 69, 72, which incidentally are supported on cam sleeve 84, is a dowel pin 86 which also projects through a collar 87 fixed to shaft 74. Thus, dowel pin 86 acts as a driving connection to rotate the cam assembly 26. Annular member 82 is provided with a pointer 88 for use in conjunction with the graduations 89 inscribed on the dial member 81. Although the specific uses of the motor unit will be described later, it is now apparent that by operation of key 49 the apparatus may be brought into phase with distant apparatus. The orienting mechanism may adjust the apparatus so as to centralize the operation of contact pairs 71, 73 with incoming signals.

With particular reference to Figs. 6 to 15, a description will now be given of the conversion unit which converts five unit start-stop signals into seven unit continuous signals. Numeral 101 represents a base plate which supports a front wall 102 and a rear wall 103. Suitably mounted on walls 102, 103 by means of bearings 104, 106 is a shaft 107. A second shaft 108 extends between walls 102, 103 and is mounted on the bearings 109, 111. Transverse to shafts 107, 108 there is supported on bearings 112, 113 a continuously rotating shaft 114 which is suitably coupled to shaft 18 of the previously described motor unit. Carried by shaft 114 is a gear 116 which is in mesh with a gear 117 fast to shaft 107. Also carried by shaft 114 is a gear 118 which is in mesh with gear 119 fast to shaft 108. Thus, by the above described gearing arrangements continuous rotary motion is imparted to shafts 107, 108. For contributing to the clarity of the description, shaft 107 may be identified as the five unit shaft while shaft 108 may be called the seven unit shaft.

At the front end of shaft 107 is carried a receiver cam sleeve 121 operable under the control of a single magnet selector mechanism 122 in a manner well known in the art. Such a single magnet selector is shown in the United States patent of Zenner No. 1,937,376, dated November 28, 1933. Each time a start impulse is received by selector magnet 123, stop arm 124 carried by sleeve 121 is freed for rotation as clutch members 120 and 125 become effective, and cams 126-1 to 126-5 sequentially set five swords 127 in either a marking or spacing position according to received signals. Cam 128 is an armature assist cam which assists the operation of armature 129 of selector magnet 123, while cam 132 is a locking cam which operates locking lever 133. The function of cams 128, 132 form no novel part of the present invention and reference should be had to the Zenner patent for a more complete description of these operations. As the swords 127 are set their pointed ends press against either surface 134 or 136 of associated transfer levers 137 which are pivoted at 138 and have their ends nested in notches of associated slidable code bars 139-1 to 139-5.

Also mounted on shaft 107 are cam sleeves 141 and 142 which are independently released for a single revolution as will be later described. Discs 143, 144, and 146 are driving clutch members which are carried by the shaft 107. Discs 147 and 148 are carried by cam sleeve 141 while discs 149 and 151 are carried by cam sleeve 142. The clutch members are provided with the usual felt washer 152, 153, 154, and 156. The entire assemblage just described is spring pressed towards the front of the apparatus by a coiled spring 157 nested in a hollow portion 158 of gear 117. This, of course, is for the purpose of providing the necessary gripping pressure for the clutch members.

On selector sleeve 121 is secured a cam 159, the periphery of which is pursued by follower arm 161 of clutch throwout lever 162 which is suitably pivoted in the apparatus. Clutch throwout lever 162 includes a stop arm 163 which is bent over at 164 to engage lug 166 formed as part of disc 167 secured to cam sleeve 141. Near the end of a revolution of cam sleeve 121, follower 161 of clutch throwout lever 162 is lifted outwardly by cam 159, freeing stop arm 163 from the path of lug 166 of disc 167 and enabling sleeve 141 to rotate for a single revolution. After sleeve 141 is released, cam 159 places throwout lever 162 in its first described position to stop sleeve 141 after it has completed a revolution. Thus, the cycle continues as long as sleeve 121 is rotated. It is understood that sleeve 121 also operates in a start-stop manner for each of its rotations.

Sleeve 142 may be released for a single revolution in two different manners as will now be described. Pivotally mounted on fixed shaft 168 is an inverted U-shaped lever 169 having a follower arm 171 which rides upon a cam 172 carried by sleeve 141 and an arm 173 which includes a stop shoulder 174 which is in the path of a bent over lug 176 of stop disc 177 which is suitably fastened to cam sleeve 142. Also pivotally mounted on shaft 168 is an inverted U-shaped lever 178 having a follower arm 179 which rides upon cam 181 and an arm 182 provided with a lug 183. A third lever 184 is also mounted on shaft 168 and includes a depending arm 186 which has formed thereon a stop shoulder 187. It will be noted that lug 183 of lever 178 is bent to a position where it crosses the arm 186 of lever 184. Stop shoulder 174 of lever 169 as shown is in blocking engagement with lug 176 of stop disc 177. As cam 172 operates follower arm 171, stop shoulder 174 moves out of the path of lug 176 and sleeve 142 is permitted to move a very slight distance until lug 176 abuts against stop shoulder 187 of lever 184. Cam 181 now operates against lever 178 which by means of its lug 183 pushes against arm 186 of lever 184 and stop shoulder 187 is moved out of the path of lug 176 and sleeve 142 is free to complete its single revolution until again stopped by shoulder 174 of lever 169. It is thus seen that the successive action of cams 172, 181 may release sleeve 142.

Sleeve 142 may also be released in a second manner which will now be described. Pivotally mounted on shaft 168 is a lever 188 which includes a depending arm 190 having bent over lug portion 189 which also crosses arm 186 of lever 184. Fastened at 191 to lever 188 is a link bar 192 which at its other end is secured at 193 to a lever 194 which is pivoted at 196 and by means of a follower portion 197 rides upon the cam 198 carried upon sleeve 195 mounted on shaft 108. Thus, as the low part of cam 198 engages follower 197 of lever 194, a spring 199 functions to shift link bar 192 in a direction toward shaft 107, lug 189 of lever 188 is moved against arm 186 of lever 184 and stop shoulder 187 is moved out of the path of lug 176 of stop disc 177 carried by sleeve 142. It is, therefore, now apparent that if cam 172 has functioned to operate lever 169 to remove stop shoulder 174 also from the path of lug 176 of stop disc 177, sleeve 142 is free to rotate providing follower portion 197 of lever 194 is riding the low part of cam 198. The purpose of this arrangement will appear as the automatic insertion of idle signals is later described.

Returning now to the slidable code bars 139-1 to 139-5 the description of the mechanism for converting the five unit signals into seven unit signals will now be resumed. Mounted on sleeve 142 are function cams 201, 202, 203, and 204. Pivotally mounted on rod 168 is a large substantially U-shaped bail 206 which includes a follower projection 207 designed to ride upon the cam 202 under impetus of spring 208. As the high part of cam 202 presents itself to projection 207 the lower portion of bail 206 pushes the individual projections 209 of seven code bars 211-1 to 211-7 moving all code bars to the right as viewed in Fig. 13 against the influence of their individual springs 212.

Pivotally mounted at 213 is a lever 214 which is provided with a follower arm 216 engaging cam 203, and an arm 217 to which is pivotally connected at 220 a stripper bail 218. Also pivotally associated with stripper bail 218 at 21 is a lever 219 which is pivoted at 221 for the purpose of maintaining bail 218 parallel when it is operated. Beneath the stripper 218 are pivotally mounted on rod 222 a series of character bars 223 which also underlie five unit code bars 139-1 to 139-5 and seven unit code bars 211-1 to 211-7. Now as stripper bail 218 is operated as follower arm 216 of lever 214 is operated by the high part of cam 203 against the tension of spring 224, all character bars 223 are pushed downwardly against the action of individual springs 225 and immediately thereafter the high part of cam 202 moves all code bars 211-1 to 211-7 to the right as explained above. While the bars 211-1 to 211-7 are still held, follower arm 216 of lever 214 drops to the low part of cam 203 and a character bar 223 selected by an alignment of code bars 139-1 to 139-5 is allowed to drop into either wide notches 226 or narrow notches 227 of code bars 211-1 to 211-7. Now as cam 202 releases bail 206, code bars 211-1 to 211-7 which present a narrow notch 227 to a selected character bar 223 will be held to the right in a marking position. However, those character bars which present a wide notch 226 to the selected character bar 223 will be moved to the left or spacing position by springs 212. Now according to the operation of code bars 211-1 to 211-7, transfer levers 231 which are pivoted at 232 will be set since their depending arms 233 rest in projections 234 carried by the code bars.

Pivotally carried on rod 236 is a transfer bail 237 which is spring urged to the right as viewed in Fig. 13 by spring 138 and carries at its lower end a cross rod 239. On cross rod 239 are mounted selector swords 241-1 to 241-7 and two idle signal swords 242, 243. Transfer bail 237 includes a follower arm 244 which rides upon cam 246 mounted on cam sleeve 195 of shaft 108. Thus, as the high part of cam 246 engages follower arm 244, transfer bail 237 is rocked back and forth and swords 241-1 to 241-7 acquire a selective setting from transfer levers 231 in conventional telegraph fashion. Swords 241-1 to 241-7 will now engage either surface 247 or 248 of latching levers 249-1 to 249-7 which are pivoted at 250. Mounted on rod 260 are a pair of lock bails 252, 253 having respective follower arms 254, 256 for engaging respective cams 257, 258. Locking bails 252, 253 are provided with the usual blades 259 which may engage either side of a projection 261 formed on latching levers 249-1 to 249-7. When the high part of cam 258 engages follower 256, bail 253 frees latching levers 249-1 to 249-3 and an idle signal latching lever 270 for operation. When the high part of cam 257 engages follower arm 254 of bail 252, latching levers 249-4 to 249-7 and an idle signal latching lever 265 are freed for operations. When the latching levers are freed for operation as just described, they assume the position of their associated swords 241-1 to 241-7 and accordingly their shoulders 259 block or unblock associated gooseneck transmitting levers 261-1 to 261-7 which are mounted on rod 262. Thus, transmitting levers 261-1 to 261-7 may either close transmitting contact pairs 263-1 to 263-7 and send a marking signal or allow the contact pairs to remain open and send a spacing signal when operated by their respective cams 264-1 to 364-7. In a like manner, idle signal latching levers 270, 265, respectively, control the operation of idle transmitting levers 266, 267 which are respectively operated by cams 268, 269. Transmitting lever 266 is adapted to send a marking impulse for the second element of the code and transmitting lever 267 is adapted to send marking impulses for the fifth and seventh elements of the code. However, it should be pointed out that idle signal latching levers 270, 265 are differently shaped and are respectively provided with projections 271, 272 which block all transmitting levers 261-1 to 261-7 from operation when the idle signal is transmitted as will be later described. This is accomplished as projections 271, 272 are moved to a position to block the depending arms 273 of the transmitting levers 261-1 to 261-7.

The mechanisms involved in the automatic transmission of idle signals will now be described, with particular reference to Fig. 10. Mounted on rod 168 is a large U-shaped locking bail 277. Pivotally carried at 278 by bail 277 is a follower lever 279 which rides upon cam 204. Attached to follower 279 by means of pivot screw 282 is a link bar 283 which is slotted at its opposite end as indicated by numeral 284 to receive bolt 286 carried by a follower arm 287 which is pivoted at 288 and rides upon cam 289. When the high part of cam 204 presents itself to follower 279 and the apex of cam 289 presents itself to follower 287, link bar 283 is shifted to the left as shown in Fig. 10. When this occurs, locking blade 290 of bail 277 is freed from projection 291 of an idle signal control lever 292 which is pivoted at 293. However, if follower 279 is on the high part of cam 204 and follower 287 is on the low part of cam 289, follower 287 does not exert the additional motion which is necessary to shift link 283 far enough to the left to free the idle signal lever 292. By the same token, when follower 279 is on the low part of cam 204 and the follower 287 rides the apex of cam 289, again insufficient motion is imparted to link bar 283 to free the idle signal lever 292. In other words, the sum of the motions produced by the high part of cam 204 and the apex of cam 289 is necessary to shift link bar 283 sufficiently to free idle signal lever 292.

Also pivoted at 293 is a divide pawl 294 which rides upon the cam 201. It is so termed because operation of divide pawl 294 determines whether an idle or a message signal will be transmitted. In the position shown in the drawings, idle lever 292 is locked in its message or line position by blade 290 of bail 277. Also, divide pawl 294 is shown latched up on shoulder 296 of a latching lever 297 which is pivoted at 298 and urged in a clockwise direction by spring 299. A spring 301 interconnects divide pawl 294 and idle signal lever 292 while a lighter spring 302 tends to urge idle signal lever 292 counterclockwise. Now in each revolution of cam 201, the apex of this cam operates divide pawl 294 to latch it up on latching lever 297. Also in each revolution of continuously rotating cam sleeve 195 the cam 246 operates transfer bail 237, and near the end of its stroke, after a selection has been transferred, a portion of the bail 280 strikes latch 297 and thereby releases divide pawl 294.

With reference now to the timing diagram (Fig. 15) a resume of the various operations will be given and the automatic insertion of idle signals will be explained. Five unit start-stop signals are received by selector magnet 123, as sleeve 121 is rotated. Approximately during receipt of the fifth impulse by selector magnet 123, cam 159 functions to release sleeve 141. Now, assume message signals are being transmitted, cam 198 mounted on sleeve 195 carried by seven unit shaft 108 will function to release sleeve 142 in conjunction with cam 172 of sleeve 141 in a manner explained in an earlier portion of the specification. It should be remembered that sleeve 195 is a continuously rotating sleeve, while sleeve 142 is a start-stop sleeve. Therefore, sleeve 195 is continuously gaining on sleeve 142.

Now as sleeve 142 is released, cam 203 operates stripper bail 218 and all character bars 223 are moved downwardly. Cam 202 now functions to move all code bars 211-1 to 211-7 to the right as described. A selected character bar 223 is operated, as the low part of cam 203 is presented to lever 214 and swords 241-1 to 241-7 are set in their selected positions. Cams 289 and 204 combine to unlock idle signal lever 292 by operation of bail 277. Directly after cam 289 operates, cam 246 operates to transfer a new setting to swords 241-1 to 241-7 by operating bail 237. Cams 257, 258 function successively to enable latching levers to acquire the new setting as bails 252, 253 are operated. This new setting is transmitted immediately thereafter as shown in the timing chart. Prior to the operation of bail 237, divide pawl 294 is latched up on latch 297 by operation of cam 201 and is again tripped by bail 237 near the end of its stroke so that it rides again on the low part of cam 201. Now as long as cam 246 of the seven unit sleeve 195 is operating later than cam 201 of start-stop sleeve 142, idle signal lever 292 will be retained in its live or message signal position during a transfer since with divide pawl 294 latched up on latch 297, spring 301 is distended and tends to pivot idle signal lever 292 clockwise. It is assumed in the present description that sleeve 195 and sleeve 142 are moving towards the left in the timing diagram and that the apex of cam 289 is at this time in line with the high part of cam 204. After a series of cycles the apex of cam 289 will be operating in step with the low part of cam 204 and obviously bail 277 cannot unlock idle signal lever 292 at this time. Now as cam 289 continues to gain on cam 204, a point will be reached where the apex of cam 289 will again function in step with the high part of cam 204. This is an indication it is now time to insert an idle signal which must be inserted without losing a signal stored on transfer levers 231. In other words, transfer of the stored signal must be delayed as will hereafter appear while an idle signal is transmitted and such an operation must be accomplished without loss of any message signals.

When seven unit sleeve 195 has gained on sleeve 142 to the point where the apex of cam 289 again operates in conjunction with the high part of cam 204 to unlock idle signal lever 292, idle signal lever will now be moved to its idle position by spring 301. Now as the transfer is made by bail 237, idle signal swords 242, 243 will be set in their idle positions. Bail 237 will again attempt to trip latch 297 at the end of its stroke but it will be ineffective since latch 297 will still be tripped from the previous cycle. These just described operations were made possible since divide pawl 294 is now operated at this point after the transfer has been made by bail 237 and after latch 297 was ineffectually operated.

While message signals were being transmitted, cams 198 and 172 were effective to release sleeve 141 as explained. However, the release of sleeve 142 is now delayed as the idle signal is transmitted. The combined action of cams 172 and 181 of sleeve 141 will now be necessary to release sleeve 142. When idle signal sword 242 moves to its idle position, projections 311 of idle signal latching levers 270, 265 move into the path of projection 312 of lever 194 so that cam follower projection 197 of lever 194 cannot move to the low part of cam 198, and, therefore, link bar 192 cannot function to release cam sleeve 142 in conjunction with cam 172. In other words, sleeve 142 cannot be released until cam 181 operates after cam 172. During this time sleeve 195 makes a further gain on sleeve 142 due to the delay in releasing sleeve 142. At this time the idle signal is being transmitted by idle transmitting levers 266, 267, while transmitting levers 261-1 to 261-7 are blocked by projections 271, 272 of latching levers 270, 265. Now, while the idle signal is being transmitted, cam 201 will function to reset divide pawl 294. The apex of cam 289 will again be in step with a high part of cam 204 so that before cam 246 operates to make the signal transfer, divide pawl 294 by means of spring 299 will move idle signal lever 292 to its live or message position. As the idle signal transfer is made by operation of cam 246 and bail 237, the signal which was delayed will not now be transferred. It will be noted that this is accomplished approximately in the latter half of the transmission of the sixth element of the idle signal. It will be further noted that cams 258, 257 function immediately afterward to operate bails 252, 253 and permit transmitting levers 261-1 to 261-7 to acquire the delayed massage code combination and now transmit the delayed signal. During this interval when the above transfer was made, the idle signal swords 242, 243 were moved to their idle position and levers 270, 265 were accordingly operated so that projections 311 of levers 270, 265 no longer block lever 194 from operation. However, now the high part of cam 198 holds the follower projection 197 of lever 194 so that the sleeve 142 cannot be released by the combined action of cams 172 and 198. However, immediately thereafter the low part of cam 198 will present itself to the follower projection 197 of lever 194 and the sleeve 142 will now again be released in successive cycles by the operation of cams 172 and 198 until it is time to insert another idle signal. It may be further observed that while the release of sleeve 142 was delayed, the operation of cams 203, 202 carried thereby was also delayed so that the setting of the code bars 211-1 to 211-7 and transfer levers 231 in accordance with the next following message signal was also temporarily deferred. Such a transfer now occurs immediately after the preceding delayed signal is transferred to swords 241-1 to 241-7 by operation of cam 246 and bail 237. Thus, there is no loss of signals when the idle signal is inserted. It will be noted that when cam sleeve 142 is at a complete rest and start-stop signals are being converted, a high part of cam 204 presents itself to follower 279 of bail 277 so that the idle signal lever 292 may be released to its idle position for the transmission of a series of idle signals. Divide pawl 194, of course, will not be operated with cam sleeve 142 idle and it will remain continuously in its tripped position under these conditions.

Figure 16:
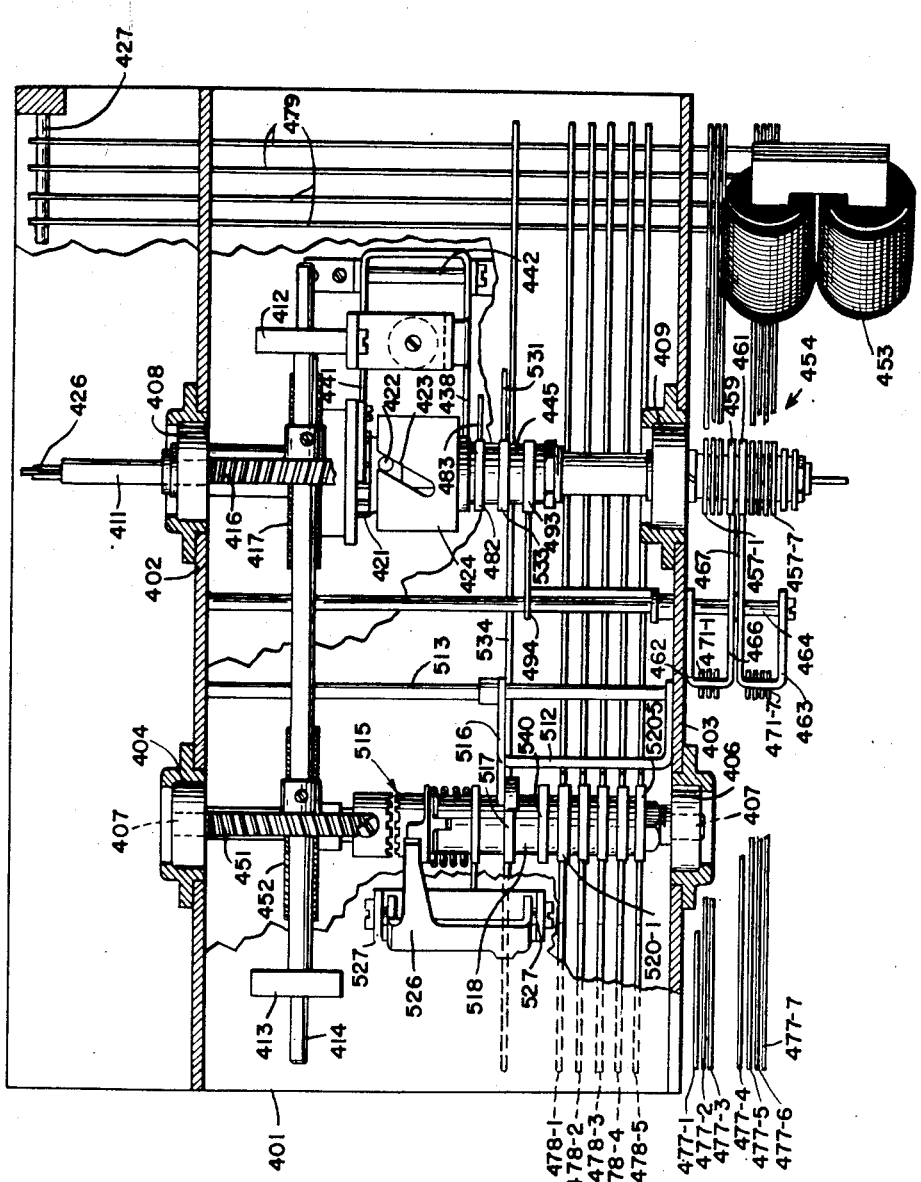
Fig. 16 is a plan view of the seven to five unit code converter unit.

Having reference now to Figs. 16 and 22, a description will be given of the converter unit which converts seven unit continuous signals into five unit start-stop signals. Numeral 401 represents the base of the unit upon which is suitably mounted end walls 402, 403. On bearings 404, 406 secured to end walls 402, 403, respectively, is mounted shaft 407, while on bearings 408, 409 secured to end walls 402, 403, respectively, is mounted shaft 411. Suitably mounted on bearings 412, 413 is a shaft 414 which is coupled in any conventional manner to the motor unit hereinbefore described.

Fast to shaft 414 is a gear 416, which is in mesh with a gear 417 carried about the shaft 411. The relationship of shaft 414 to gear 417 is adjustable by means of a finder arrangement to be later described while the position of a seven unit receiving cam sleeve 418 may be adjusted by means of an orienting mechanism now to be described. Gear 417 has pivoted thereon at 420 a pawl 419 which is normally spring pressed into engagement with a ratchet 421 secured to shaft 411. Projecting from ratchet 421 is a pin 422 which engages in a spiral slot 423 carried by a cut like member 424 which is suitably secured to cam sleeve 418. Shaft 411 is slidable in bearings 408, 409 and is normally urged to the left by a lever 426 which is pivoted at 427 and urged counterclockwise by spring 428. At its front end, shaft 411 is engaged by a lever 429 against which bears a cam surface 431 of a pivoted indicator 432 mounted on orienting plate 433. Plate 433 is similar to plate 105 shown in Fig. 4 of United States Patent No. 1,904,164 of Morton et al. dated April 18, 1933. Plate 433 is provided with the usual graduations (not shown) and thus an operation by grasping the handle 434 of pivoted indicator 432 may vary the position of shaft 411. This causes pin 422 to move in the spiral slot 423 of member 424 to rotate member 424 and cause the sleeve 418 therefore to be adjusted with respect to shaft 411 or more properly with respect to the incoming signals.

Operation of a finder mechanism associated with this conversion unit will now be described. The finder mechanism operates in a somewhat similar manner to the finder mechanism described in connection with the motor unit. It will be understood that both the finder mechanisms may not have to be used. The finder mechanism about to be described may find utility if a separate motor were used to drive the seven to five unit code conversion unit, rather than the motor unit previously described. As described above, pawl 419 carried on gear 417 is in engagement with ratchet 421 and thereby drives ratchet 421. Operable by a finder magnet 436 is an armature 437 having a follower arm 438 and a pawl tripping arm 441, the armature being pivoted on rod 442. When finder magnet 436 is energized due to failure of the apparatus to be in phase with apparatus at a remote station in response to the receipt of idle signals, the armature 437 is attracted and when groove 443 of a cam 444 carried on sleeve 445 presents itself to follower arm 438, the follower arm 438 will drop into the groove and the free end of pawl tripping arm 441 will move into the path of pawl 419 and cause the pawl to be tripped and engage the next succeeding tooth of the ratchet so that the driving relationship between gear 416 and cam sleeve 418 has been altered. This operation is cyclically repeated until the correct phase is established. There are seven teeth on the ratchet 421 which represents the seven code elements of a signaling code combination. Thus, the finder mechanism may be used for phasing the apparatus with respect to incoming signals while the orienting device can be used for adjusting cam sleeve 418 within the individual impulses. Contact pair 448 is operated in a manner similar to contact pair 56 which was described in connection with the finder mechanism included with the motor unit.

Also carried on shaft 414 is a gear 451 which is in mesh with a gear 452 carried on shaft 407. For the purpose of the present description shaft 411 may be referred to as the seven unit shaft and shaft 407 may be considered to be the five unit shaft. Incoming continuous seven unit signals are received by the selector magnet 453 which is part of a single magnet selector 454. As the signals are received the seven swords 456 are set in the usual manner according to the nature of the received impulses by the sequential operation of cams 457-1 to 457-7 carried by receiving cam sleeve 458. In addition, cam sleeve 458 carries lock cams 459, 461 which respectively operate lock bails 462, 463 during receipt of the seventh and first impulses of a code combination. Bails 462, 463 are both pivoted on the rod 464 and are provided with the usual springs 465 for enabling the bails to follow the periphery of their cams by means of their respective follower arms 466, 467. Each bail is provided with a locking blade 468 designed to engage either side of projections 469 carried by locking levers 471-1 to 471-7. Bail 462 controls locking levers 471-1 to 471-3 and bail 463 controls locking levers 471-4 to 471-7. The pointed end of swords 456 may engage either surface 472 or 473 of associated lock levers 471-1 to 471-7 and accordingly operate the lock levers about the pivot 474 when the locking bails 462, 463 are operated. The lower ends of levers 471-1 to 471-7 are engaged in notches 476 of associated notched seven unit code bars 477-1 to 477-7. Underlying the seven unit code bars 477-1 to 477-7 and the five unit code bars 478-1 to 478-5 are a series of character bars 479 which are pivoted on rod 427 and urged upwardly by individual springs 481.

Carried on sleeve 418 is a cam 482 which in each cycle of operations rocks the follower 483 about its pivot 484. Follower 483 is urged clockwise by means of a spring 487 and is pivotally connected at 488 with stripper bail 489. For maintaining parallelism, bail 489 is pivotally connected at 491 with a lever 492 which is pivoted at 490. As the high part of cam 482 works against follower 483, all character bars 479 are moved downwardly and while they are so held a cam 493 operates a follower 494 about its pivot 495 against the tension of spring 496 to push all code bars 478-1 to 478-5 to the left by reason of the engagement of follower 494 with projection 497 of the code bars. Follower 483 now drops off the high part of cam 482 while code bars 478-5 are held to the left and a selected character bar 479 now moves into an alignment of notches in code bars 477-1 to 477-7 and into an alignment of wide notches 498 and narrow notches 499 of code bars 478-1 to 478-5. Now when follower 494 drops to the low part of cam 493, code bars 478-1 to 478-5 having wide notches 498 in engagement with the selected character bar 479 will be allowed to be drawn to the right or spacing position by individual springs 501, while those having narrow notches 499 will be retained to the left in marking positions. Pivotally supported at 502 on individual code bars 478-1 to 478-7 are latches 503, which are spring urged to the left by individual springs 504. Formed on latches 503 are bifurcations 506 which straddle the lower end of a latching lever 507 which is pivoted at 508. At its upper end, each latching lever 507 is provided with a projection 509 designed to be engaged at either side by blade 511 of locking bail 512 which is pivoted on rod 513 and urged counterclockwise by spring 514. Bail 512 includes a follower arm 516 which rides upon cam 517 carried by transmitting sleeve 518 of shaft 407. When bail 512 is operated, latching levers associated with code bars 478-1 to 478-5 set in spacing position will be in the position shown and shoulders 519 of lever 507 will prevent closure of transmitting contact pair 521 by transmitting gooseneck lever 522 when cam sleeve 517 and cams 520-1 to 520-5 are released. On the other hand, upon operation of bail 512, those code bars 478-1 which are in marking position to the left by means of springs 504 will now cause levers 503 to pivot slightly counterclockwise thereby withdrawing shoulder 519 from the path of transmitting gooseneck levers 522 and enable closure of transmitting contact pairs 521-1 to 521-5 when cam sleeve 518 is released for operation. It should be pointed out that as a code bar 478-1, for example, is moved to the left, spring 504 is placed under tension and tends to draw lever 503 counterclockwise but cannot do so until bail 512 is operated. This makes possible a signal overlap arrangement to hold a signal code combination by means of code bars 478-1 to 478-5 until bail 512 is operated.

The means of releasing the transmitting sleeve 518 by operation of clutch 515 will now be described. Carried by sleeve 518 is a release disc 524 which in the rest position of the sleeve, has a high part in engagement with stop arm 525 of the clutch lever 526 which is pivoted at points 527 and urged in a clockwise direction by spring 528. Pivoted at 529 is a follower 531 which is urged clockwise by a spring 532 and rides upon a cam 533 carried by sleeve 418 of shaft 411. In the position shown, follower 531 holds a slidable bar 534 to the left. However, when follower 531 is operated by cam 533, a spring 536 pulls bar 534 to the right and a projection 537 formed thereon engages tail 538 of clutch lever 526 to thereby release cam sleeve 518. When an idle signal is received, idle character bar 539 will move into notch 541 of bar 534 to thus prevent the release of cam sleeve 518.

A typical conversion operation by means of the seven to five unit converter will now be briefly described. A seven unit signal code combination is received by selector magnet 453. During receipt of the sixth element of the code, bail 466 operates and code bars 477-1 to 477-3 are set. During the next following first element period of the code, bail 467 operates and code bars 477-4 to 477-7 are set. Immediately thereafter, cam 482 and follower 483 function together with cam 493 and follower 494 as explained to enable code bars 478-1 to 478-5 to receive the converted selection. Approximately during the fifth element period of the seven unit code, cam 533 functions to release cam sleeve 518. Immediately thereafter bail 512 operates and frees latching levers 507. The five unit start stop signal is transmitted as cam sleeve 518 is released. It should be mentioned that the usual start-stop transmitting cam 540 is provided on sleeve 518. If an incorrect signal is received by the seven unit selector which is not composed of three marking and four spacing impulses, the five unit start-stop sleeve 518 will be released and all spacing signal will be transmitted as no character bar is selected at this time since all code bars 478-1 to 478-5 will move to their spacing positions. Receipt of an all spacing signal by the five unit receiving station will cause the printing of an error indication character.

What is claimed is:

1. In a telegraph converter apparatus, selector means responsive to the receipt of continuous signal code combinations, including idle signal code combinations, a first series of code bars controlled by said selector means in accordance with the receipt of said signal code combinations by said selector means, a series of character bars individually selectable by said code bars, a second series of code bars less in number than said first series of code bars and controlled by said individual character bars, a series of transmitting means individual to said second series of code bars and controlled thereby, means for cyclically operating said transmitting means to transmit signal code combinations composed of equal length impulses, means to transmit start-stop impulses to accompany each of said code combinations, and means responsive to the receipt of said idle signal code combinations by said selector means for preventing the operation of said cyclically operative means to thereby delete said idle signal code combination.

2. In a telegraph converter apparatus, selector means responsive to the receipt of continuous signal code combinations including idle signal code combinations, a first series of code bars controlled by said selector means in accordance with the receipt of said signal code combinations by said selector means, a series of character bars individually selectable by said code bars, a second series of code bars less in number than said first series of code bars and controlled by said individual character bars, a series of transmitting means individual to said second series of code bars and controlled thereby for transmitting signal code combinations composed of equal length impulses, means to transmit start-stop impulses to accompany each of said code combinations, means for cyclically operating said transmitting means including a clutch having a clutch operating lever, and means responsive to the receipt of said idle signal code combination by said selector means for preventing the operation of said clutch lever to thereby delete transmission of the idle signal code combinations.

3. In a telegraph converter apparatus, a single magnet responsive to the receipt of continuous signal code combinations, a first series of code bars, means controlled by said single magnet in accordance with the receipt of said signal code combinations for selectively positioning said first series of code bars, a series of character bars individually selectable by said code bars, a second series of code bars less in number than said first series of code bars, means selectively controlled by said individual character bars for positioning said second series of code bars, a series of transmitting levers, means for transferring a selection from said second series of code bars to said transmitting levers, means associated with said transmitting levers for transmitting signal code combinations composed of equal length impulses, means to transmit a start-stop impulse to accompany each of said signal code combinations, and means for preventing the operation of the transmitting means upon reception of a predetermined continuous signal code combination in the magnet.

4. In a telegraph code converter apparatus, a single selector magnet for receiving signal impulses of a first predetermined code, a first series of code bars, means actuated by the selector magnet for permutatively positioning said code bars in accordance with the reception of signal code impulses, a second series of code bars, mechanically operated means for transferring the permutated setting of the first series of code bars to the second series of code bars, transmitting means for transmitting signal impulses in accordance with the setting of the second series of code bars, and a mechanical lock means operated by a predetermined permutative setting of the first series of code bars for preventing the operation of the transmitting means.

5. In a telegraph code converter, selector means for receiving signal impulses of a first predetermined signal code, means positioned by said selector means in accordance with said incoming signal impulses, a series of code bars, mechanically operated means for transferring the setting of the positioned means to the code bars whereby the code bars are set in a permutation different from the setting of the positioned means, a series of transmitting contacts, means to actuate the transmitting contacts in accordance with the setting of the code bars for transmitting signal impulses in a second predetermined code, and means responsive to a predetermined setting of the positioned means for preventing the operation of the transmitting contacts.

6. In a telegraph code converter, a first set of code bars, a selector magnet, a continually rotatable first shaft, cams mounted on the first shaft, means controlled by the cams and the selector magnet for permutatively positioning the first set of code bars, a second set of code bars, an intermittently operated second shaft, a group of second cams mounted on the second shaft, means for transferring the setting of the first set of code bars to the second set of code bars in a different permutation, a clutch associated with the second shaft, a mechanism controlled by the first continually rotating shaft for cyclically releasing the clutch to operate the second intermittently rotatable shaft, and means controlled by the rotation of the group of second cams and the setting of the second set of code bars for transmitting signal impulses in accordance with the permutative setting of the second group of code bars.

7. In a telegraph code converter apparatus, a single selector magnet for receiving signal code impulses of a predetermined code, a continually rotative shaft having a plurality of operating cams mounted thereon, a first series of code bars, means cooperating with a portion of said cams and selectively positioned by energization of said selector magnet for positioning said series of code bars in accordance with the received signal impulses, a series of character bars, mechanical means controlled by another of said cams for selectively positioning said character bars in accordance with the selective setting of said first series of code bars, a second series of code bars, means for biasing said second series of code bars in a predetermined direction, mechanical means controlled by another of said cams for moving said second series of code bars against said biasing means into a position to be selectively engaged by said character bars, said last mentioned cam means further functioning to release said second series of code bars whereby certain of said second series of code bars are permutatively retained by said selected character bars in a permutation different from that of the first series of code bars, transmitting means adapted to transmit signal impulses in accordance with the permutative setting of the second series of code bars, and mechanical means controlled by another of said cams for initiating operation of said transmitting means.

8. In a telegraph code converter, a first set of code bars, a selector magnet, a rotatably mounted shaft, a plurality of cams mounted on the shaft, means adapted to be controlled by a portion of the cams and the selector magnet for permutatively positioning the first set of code bars, a second set of code bars, a series of character bars, means for urging the character bars into engagement with both sets of code bars, a first bail controlled by one of said cams for holding the character bars against the effect of the urging means, means for urging the second set of code bars in a predetermined direction, a second bail controlled by another of said cams for holding said second code bars against the effect of the urging means, transmitting means adapted to be controlled by the second set of code bars, a clutch associated with the transmitting means for holding said transmitting means from operation, a clutch release mechanism controlled by another of said cams, and means for continuously rotating said cam shaft whereby said first code bars are permutatively positioned by the joint action of the cams associated therewith and the energization of the selector magnet in accordance with incoming signals, said cams further functioning to release the bail associated with the character bars to permit the first code bars to select one of the character bars, then releasing the bail associated with the second code bars to permit the second code bars to be permutatively positioned in accordance with the particular character bar selected, and finally actuating said clutch release mechanism to cause the transmitting means to transmit a signal in accordance with the permutative setting of the second set of code bars.

MARTHA W. C. POTTS,
*Executrix under the last will and testament of Louis M. Potts, deceased.*

References Cited in the file of this patent

UNITED STATES PATENTS

| Number | Name | Date |
|---|---|---|
| 2,273,776 | Zurek | Feb. 17, 1942 |
| 2,309,222 | Spencer | Jan. 26, 1943 |